UNITED STATES PATENT OFFICE.

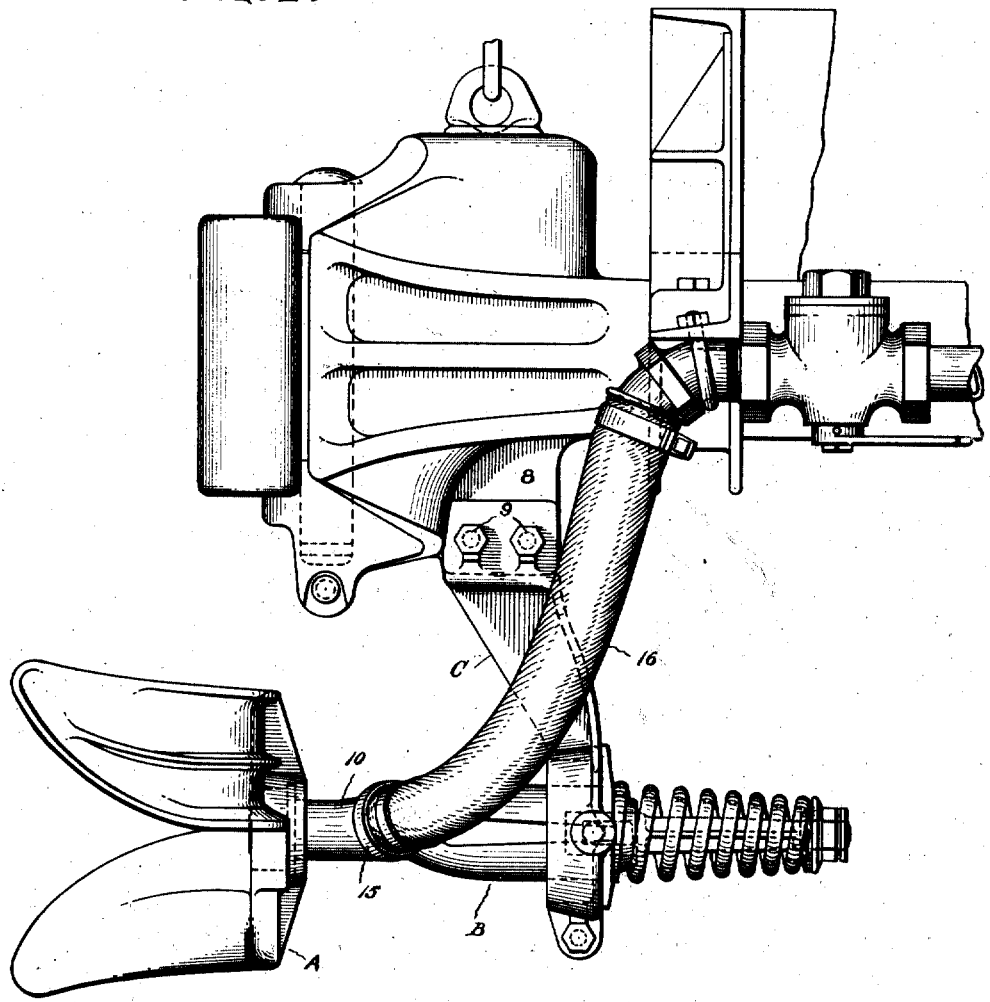

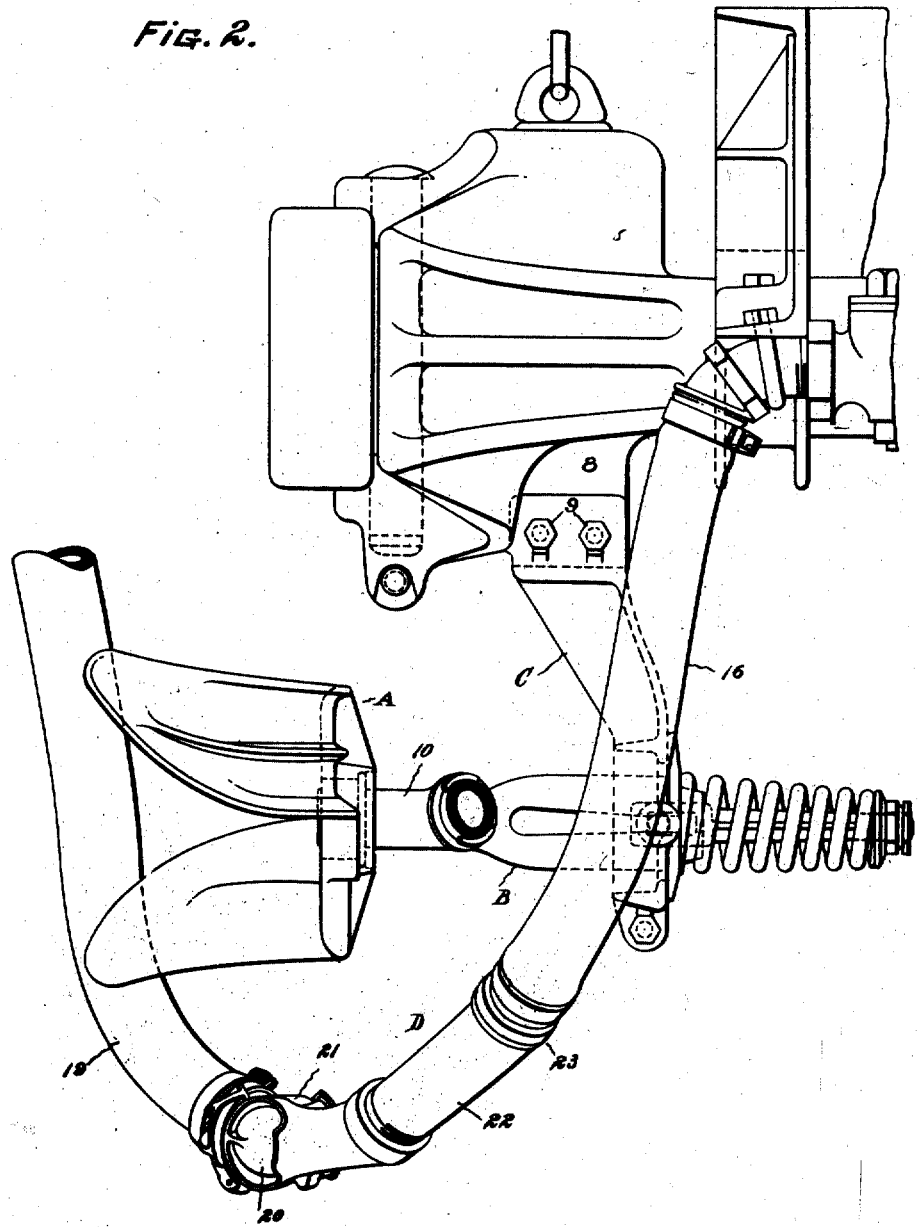

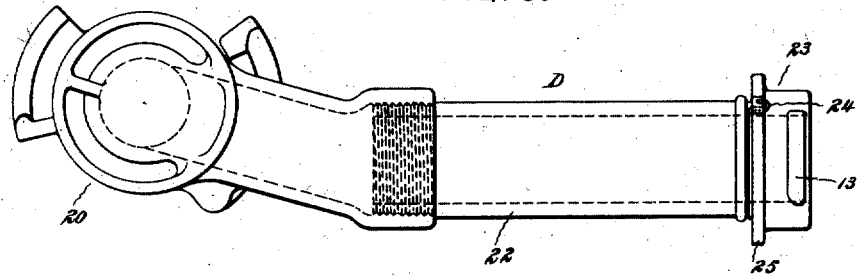
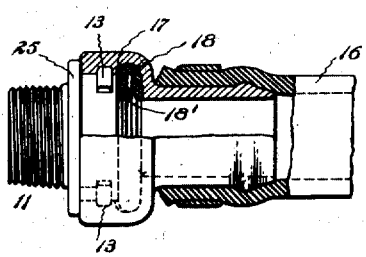
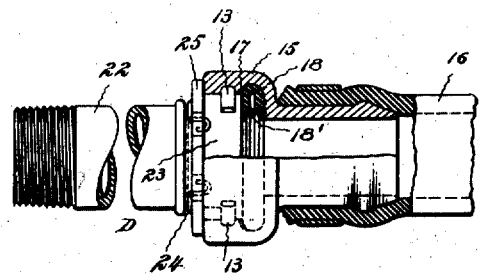
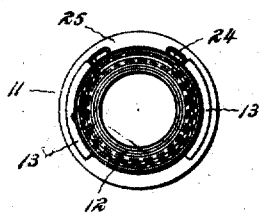
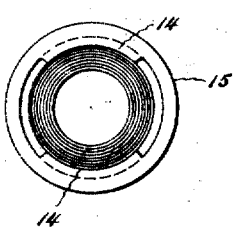

JOSEPH V. ROBINSON, OF CHEVY CHASE, MARYLAND.

AUTOMATIC TRAIN-PIPE CONNECTOR.

1,245,799.   Specification of Letters Patent.   Patented Nov. 6, 1917.

Application filed October 15, 1914. Serial No. 866,825.

*To all whom it may concern:*

Be it known that I, JOSEPH V. ROBINSON, a citizen of the United States, and resident of Chevy Chase, county of Montgomery, State of Maryland, have invented certain new and useful Improvements in Automatic Train-Pipe Connectors, of which the following is a specification.

The object of my invention is to produce a common improved means for connecting the train pipe hose of a car to the automatic connector and for effecting efficient interchange between such car and one not equipped with the automatic device. The construction greatly expedites the renewal of defective hose and provides a convenient, simple means for effecting efficient interchange of cars during the period of transition.

To this end my invention consists in the combinations, improvements and constructions hereinafter described, pointed out in the appended claims, and illustrated in the accompanying drawings, in which:

Figure 1, is a side elevation of my improvement.

Fig. 2, is a view similar to Fig. 1, showing my improved means of connecting the hose of a car to the automatic connector, connected to the interchange device for coupling a car not equipped with the automatic connector to a car having it.

Fig. 3, is a side elevation of my improved interchange device or coupling D.

Fig. 4, is a side view of my improved means for connecting the hose of a car to the automatic connector. In this view some of the parts are shown in section.

Fig. 5, is a view similar to Fig. 4 but shows my improved means for connecting the hose of a car to the connector, coupled to the head 23 of my improved interchange device. In this view the latch for locking these members together is shown in the service position.

Fig. 6, is an end view of my improved interchange coupling. In this view the head of the coupling is omitted, and Fig. 7, is an end view of the member 15 of my improved means for connecting the hose of a car to the connector and to the head 23 of the interchange device.

Referring to the drawings: My improved connector head A is shown mounted upon a support B which yieldably supports the head, allowing it to move to the various positions required in service. Any satisfactory form of such support may, of course, be used with the connector head and any suitable form of connection for the support to the car may be employed, such as a hanger 8, to which the base C of the support is connected as by bolts 9.

My improved means for connecting the hose of a car equipped with the automatic connector to the conduit 10 of the support B and for effecting efficient interchange between a car so equipped and one having the present hand system comprises a male member 11 suitably connected to the conduit 10 as by threads, and provided with a flat corrugated face 12 and oppositely disposed radially extending projections or lugs 13 adapted to interlock or normally rest behind complementary lugs 14 of a female member 15 carried by the train pipe hose 16 of the car. Said female member is provided with a circumferential seat or groove 17 for receiving a suitable gasket or sealing device 18, the bottom of the seat being corrugated as shown to give a better joint. The gasket 18 is U shaped in cross section and hollowed out as at 18' to allow the fluid within the conduit 10 to expand the gasket axially of the hose 16 into tight engagement with the seat 17 in the member 15 and the face 12 of the member 11, which last member is positioned in the conduit 10 so that the hose 16 must be twisted to bring the lugs 14 into position to pass between the lugs 13 of the member 11. When the twist of the hose is spent or let out, the lugs 14 rotate behind the lugs 13 in which position they are maintained by the torsional resistance of the hose 16, insuring against accidental disconnection of the parts. See particularly Figs. 4 and 5.

To couple the hose 16 into interchange communication with the hose of a car not equipped with the automatic connector, it is disconnected from the member 11 by rotating it to the right or left and shifting it axially of such member 11 and is then connected to a dummy or interchange coupling D in the same manner that it is connected to the member 11, after which connection to the hose 19 of the unequipped car is effected in the fashion now universally employed; that is to say, the head 20 of the coupling D is connected with a like head 21 in the end of the hose 19. The interchange coupling comprises said head 20, a suitable shank 22, made of any suitable material and a head 23 corresponding to the member 11 in the conduit 10. A spring latch or lock 24 surrounds the shank of the coupling D, extends through an annular flange 25 of the head 23 and serves to lock the coupling D to the member 15, insuring against accidental loss thereof. Figs. 3 to 7 clearly illustrate the construction of the joint and lock. Fig. 4 illustrates particularly the construction of the male member 11 which is connected to the conduit 10 as by threads. I prefer to carry the coupling D separately of the automatic connector and use it interchangeably with a number of connectors, though I am aware that it may be otherwise carried if desired, such as connected permanently with the connector.

By the foregoing construction I have produced a simple and efficient common means for connecting the hose of a car to an automatic connector or to an interchange device, in such wise that the joint at the point of such connection is sealed, or the tightness thereof augmented, by the pressure of the fluid within said hose and said joint, whereby efficient connection of said hose to an automatic connector or to the hose of a car not equipped with the automatic device, may be readily attained.

Having thus described my said invention, what I claim as new and desire to secure by United States Letters Patent is:

1. In an automatic train pipe connector, the combination with the coupling head thereof and the train pipe hose of a car, of a fluid conduit extending from said head laterally thereof, a member connected with said conduit and provided with radially extending lugs arranged concentric with the axis of the passage through said member and having also a face, a second member connected with said hose and provided with a seat and having also inwardly projecting lugs arranged concentric with the axis of the passage through said member and adapted to cooperate with the lugs of said first member to lock the members together, and a resilient gasket mounted in said seat and extended into tight engagement therewith and with the face of said first mentioned member by the fluid pressure within said members.

2. The combination with an automatic train pipe connector applied to a car, of an interchange coupling, and a common means for connecting the train pipe hose of said car to said connector or said interchange coupling.

3. The combination with an automatic train pipe connector applied to a car, of a train pipe hose on said car, an interchange coupling separate of said hose, and means for connecting the hose to said automatic connector or said interchange coupling head, said means comprising a member connected with said hose and provided with projections adapted to cooperate with complementary projections on said connector and said interchange coupling.

4. In an automatic train pipe connector, the combination of a coupling head, a conduit leading from said head and carrying oppositely disposed projections, an interchange coupling adapted to connect with a similar coupling of the hose of a car not equipped with said automatic connector and having also oppositely disposed projections, a hose normally disconnected from said interchange coupling, a member mounted in said hose and provided with inwardly extending projections adapted to interlock with the projections either of said conduit or said interchange coupling, whereby said hose is adapted to be connected interchangeably with said conduit and said interchange coupling.

5. In an automatic train pipe connector, the combination of a coupling head, a conduit leading from said head and carrying oppositely disposed projections, an interchange coupling adapted to connect with a similar coupling of the hose of a car not equipped with said automatic connector and having also oppositely disposed projections, a hose normally disconnected from said interchange coupling, a member mounted in said hose and provided with inwardly extending projections adapted to interlock with the projections either of said conduit or said interchange coupling, whereby said hose is adapted to be connected interchangeably with said conduit and said interchange coupling, and a packing for sealing the joint between said member and said interchange coupling, said packing being extended into tight engagement with said member and said interchange coupling by the pressure of the fluid in said coupling.

6. In an automatic train pipe connector, the combination of a coupling head, a conduit leading from said head and carrying oppositely disposed projections, an interchange coupling adapted to connect with a similar coupling of the hose of a car not equipped with said automatic connector and having also oppositely disposed projections, a hose normally disconnected from said interchange coupling, a member mounted in said hose and provided with inwardly extending projections adapted to interlock with the projections either of said conduit or said interchange coupling, whereby said hose is adapted to be connected interchangeably with said conduit and said interchange coupling, and a device for locking said member and said interchange coupling against accidental disconnection one from the other.

7. In an automatic train pipe connector, the combination of a coupling head, a conduit leading from said head and carrying oppositely disposed projections, an interchange coupling adapted to connect with a similar coupling of the hose of a car not equipped with said automatic connector and having also oppositely disposed projections, a hose normally disconnected from said interchange coupling, a member mounted in said hose and provided with inwardly extending projections adapted to interlock with the projections either of said conduit or said interchange coupling, whereby said hose is adapted to be connected interchangeably with said conduit and said interchange coupling, and a yieldable latch carried by said interchange coupling for locking said member and said coupling together.

8. In an automatic train pipe connector, the combination of a coupling head, a conduit leading from said head and carrying oppositely disposed projections, an interchange coupling adapted to connect with a similar coupling of a hose of a car not equipped with said automatic connector and having also oppositely disposed projections, a hose normally disconnected from said interchange coupling, a member mounted in said hose and provided with inwardly extending projections adapted to interlock with the projections either of said conduit or said interchange coupling, whereby said hose is adapted to be connected interchangeably with said conduit and said interchange coupling, and a yieldable latch embracing said interchange coupling for preventing accidental disconnection thereof from said member but permitting ready manual disconnection thereof in service.

In testimony whereof, I have hereunto set my hand in the presence of two witnesses.

JOSEPH V. ROBINSON.

In the presence of—
 KATHERINE V. BOSWELL,
 M. C. SHERIDAN.